US008945292B2

(12) United States Patent
Oppenheim et al.

(10) Patent No.: US 8,945,292 B2
(45) Date of Patent: Feb. 3, 2015

(54) SYSTEM FOR RECOVERING ACID GASES FROM A GAS STREAM

(75) Inventors: Judith Pauline Oppenheim, Friendswood, TX (US); Anindra Mazumdar, Houston, TX (US)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 13/429,212

(22) Filed: Mar. 23, 2012

(65) Prior Publication Data

US 2013/0247766 A1    Sep. 26, 2013

(51) Int. Cl.
*B01D 53/14*    (2006.01)
*B01D 53/96*    (2006.01)
*B01D 53/52*    (2006.01)

(52) U.S. Cl.
CPC ............... *B01D 53/14* (2013.01); *B01D 53/96* (2013.01); *B01D 53/52* (2013.01); *B01D 2257/304* (2013.01); *B01D 2257/504* (2013.01); *Y02E 20/18* (2013.01); *Y02E 20/16* (2013.01); *B01D 53/1425* (2013.01); *B01D 2252/2026* (2013.01); *B01D 53/1406* (2013.01); *B01D 53/1462* (2013.01); *Y02C 10/06* (2013.01)
USPC ............... 96/234; 95/160; 95/172; 95/191; 95/192; 95/199; 95/207; 95/208; 95/223; 95/235; 95/236

(58) Field of Classification Search
CPC ........... B01D 53/1406; B01D 53/1425; B01D 53/1462
USPC ..................... 95/163, 199, 223, 236, 160–161
See application file for complete search history.

(56) References Cited

U.S. PATENT DOCUMENTS

| | | | |
|---|---|---|---|
| 6,207,120 B1 | 3/2001 | Belmonte et al. | |
| 7,597,746 B2 * | 10/2009 | Mak et al. | 95/169 |
| 7,674,325 B2 * | 3/2010 | Won | 96/234 |
| 8,007,569 B2 * | 8/2011 | Saecker et al. | 95/163 |
| 8,419,843 B2 * | 4/2013 | Frydman et al. | 96/234 |
| 2002/0021994 A1 * | 2/2002 | Blue et al. | 423/224 |
| 2010/0043290 A1 | 2/2010 | Thacker et al. | |
| 2010/0101416 A1 * | 4/2010 | Akiyama | 95/193 |
| 2010/0111784 A1 * | 5/2010 | Mak et al. | 422/190 |

(Continued)

FOREIGN PATENT DOCUMENTS

| | | | | |
|---|---|---|---|---|
| EP | 2380653 A3 * | 5/2012 | | |
| WO | WO 9703920 A1 * | 2/1997 | | C01B 17/04 |

(Continued)

*Primary Examiner* — Duane Smith
*Assistant Examiner* — Stephen Hobson
(74) *Attorney, Agent, or Firm* — Fletcher Yoder, P.C.

(57) ABSTRACT

In one embodiment, a gas purification system is provided. The system includes a first section having a first solvent path and a first gas path. The first gas path is configured to flow a stripping gas to remove hydrogen sulfide ($H_2S$) and carbon dioxide ($CO_2$) from the first solvent path in a first vessel to produce a first gas mixture. The system also includes a second section having a second solvent path. The second solvent path is configured to flow a second solvent mixture to remove $H_2S$ from the first gas mixture and $CO_2$ from the second solvent mixture within a second vessel. The second solvent mixture has a solvent saturated in $CO_2$ at a first pressure, the second vessel is operated at a second pressure, and the first and second pressures are within approximately 20% of one another.

18 Claims, 5 Drawing Sheets

(56) References Cited

U.S. PATENT DOCUMENTS

| | | |
|---|---|---|
| 2010/0183491 A1 | 7/2010 | Mazumdar et al. |
| 2011/0033356 A1 | 2/2011 | Mazumdar et al. |
| 2011/0067302 A1 | 3/2011 | Oppenheim et al. |
| 2011/0162380 A1 | 7/2011 | Thacker et al. |
| 2011/0259197 A1 | 10/2011 | Oppenheim et al. |
| 2011/0286894 A1* | 11/2011 | Frydman et al. ............ 422/187 |
| 2012/0006200 A1* | 1/2012 | Mazumdar et al. ............ 96/156 |
| 2012/0017562 A1 | 1/2012 | Mazumdar et al. |
| 2013/0056677 A1* | 3/2013 | Bela ............ 252/190 |

FOREIGN PATENT DOCUMENTS

| | | | |
|---|---|---|---|
| WO | WO 2013049114 | * | 4/2013 |
| WO | WO 2013079116 | * | 6/2013 |

\* cited by examiner

SYSTEM FOR RECOVERING ACID GASES FROM A GAS STREAM

BACKGROUND OF THE INVENTION

The subject matter disclosed herein relates to systems and methods for gas processing in a syngas-producing plant.

Gasification technology can convert hydrocarbon feedstocks, such as coal, biomass, and other carbonaceous feed sources, into a gaseous mixture of carbon monoxide (CO) and hydrogen ($H_2$), i.e., syngas, by reaction with oxygen and steam in a gasifier. These gases may be processed, and utilized as fuel, as a source of starting materials for more complex chemicals, for the production of substitute natural gas, or a combination thereof. In an integrated gasification combined cycle (IGCC) power plant, the syngas may be used for combustion to produce energy. For example, the syngas may be fed into a combustor of a gas turbine of the IGCC power plant and ignited to power the gas turbine for use in the generation of electricity. Untreated gas mixtures produced in a gasifier may contain a variety of materials in addition to the syngas. For example, the untreated gas mixtures can include sulfur-containing gases such as hydrogen sulfide ($H_2S$), carbonaceous gases such as carbon dioxide ($CO_2$), water, and others. These other materials in the untreated gas mixtures can affect the performance of the gas turbines used to produce energy from the syngas, as well as the quality of the starting materials that may be used for the production of fine chemicals.

BRIEF DESCRIPTION OF THE INVENTION

Certain embodiments commensurate in scope with the originally claimed invention are summarized below. These embodiments are not intended to limit the scope of the present disclosure, but rather these embodiments are intended only to provide a brief summary of possible forms of an implementation. Indeed, the present approaches may encompass a variety of forms that may be similar to or different from the embodiments set forth below.

In a first embodiment, a gas purification system includes a first section having a hydrogen sulfide ($H_2S$) concentrator, an $H_2S$ re-absorber, a first solvent path through the $H_2S$ concentrator, and a first gas path through the $H_2S$ concentrator and the $H_2S$ re-absorber. The gas purification system also includes a second section having a carbon dioxide ($CO_2$) absorber, a first flash vessel, and a second solvent path through the $CO_2$ absorber and the first flash vessel, wherein the second solvent path couples the first flash vessel with the $H_2S$ re-absorber.

In a second embodiment, a gas purification system includes a first section having a first solvent path and a first gas path, wherein the first gas path is configured to flow a stripping gas to remove hydrogen sulfide ($H_2S$) and carbon dioxide ($CO_2$) from the first solvent path in a first vessel to produce a first gas mixture. The gas purification system also includes a second section having a second solvent path, wherein the second solvent path is configured to flow a second solvent mixture to remove $H_2S$ from the first gas mixture and $CO_2$ from the second solvent mixture within a second vessel. The second solvent mixture includes a solvent saturated in $CO_2$ at a first pressure, the second vessel is operated at a second pressure, and the first and second pressures are within approximately 20% of one another.

In a third embodiment, a gas purification system includes a first section configured to produce acid gas having a hydrogen sulfide ($H_2S$) concentrator, an $H_2S$ re-absorber, a first solvent path through the $H_2S$ concentrator, a first gas path sequentially through the $H_2S$ concentrator and the $H_2S$ re-absorber, wherein the first gas path is configured to deliver a first gas mixture to the $H_2S$ re-absorber, and the first gas mixture includes a stripping gas, carbon dioxide ($CO_2$), and $H_2S$. The gas purification system also includes a second solvent path configured to flow a first solvent mixture saturated in $CO_2$ at a first pressure from a flash vessel to the $H_2S$ re-absorber to remove $H_2S$ from the first gas mixture.

BRIEF DESCRIPTION OF THE DRAWINGS

These and other features, aspects, and advantages of the present approaches will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

As noted above, syngas production systems, such as gasification and/or IGCC systems, typically produce a raw or untreated syngas mixture. The raw or untreated syngas mixture, in addition to the constituent gases of the syngas (i.e., $H_2$ and CO), may include, among other gases, $H_2S$ and $CO_2$. Certain plant embodiments may be configured to isolate these gases using, by way of a non-limiting example, one or more solvents (e.g., a physical and/or chemical solvent) to selectively dissolve these gases away from the syngas. Because these gases may be useful chemical precursors and/or sources of useful materials (e.g., elemental sulfur), such isolation may be desirable, for example using a gas purification system. For example, after isolation at the gas purification system, $H_2S$ may be sent to a Claus reactor to generate sulfur, which may be used as a catalyst, as a stable source of sulfur, or the like. $CO_2$ may be sent through a pipeline to a chemical plant for the production of more complex organic starting materials, such as acetic acid, carbonic acid, or other compounds. Additionally or alternatively, at least some of the $CO_2$ may be recycled to a gasifier used to produce the raw or untreated syngas mixture. Accordingly, it may be desirable to maximize the recovery of $H_2S$ and $CO_2$ during processing of the syngas within the gas purification system.

Unfortunately, it may be difficult to isolate the $H_2S$ from the $CO_2$, as these components are typically in the same gaseous streams, are typically at similar pressures, and, for certain solvents, may have similar solubility profiles. Accordingly, it may be difficult for gas purification systems to satisfy both high $H_2S$ recovery requirements for sulfur processing and high $CO_2$ recovery requirements for pipeline/recycle purposes.

The respective pressures and respective solubilities of these two gaseous components can at least partially affect the transfer of each into a given solvent. Accordingly, the present embodiments relate to systems for separating $H_2S$ from $CO_2$ and tailoring an amount of captured $CO_2$ and $H_2S$ by selective uptake of $H_2S$ into a solvent mixture at certain temperatures and pressures. Specifically, in an embodiment, a gas purification system may utilize a solvent stream that is saturated with $CO_2$ and is substantially free of $H_2S$ at a first pressure to selectively remove $H_2S$ from a gas mixture having both $CO_2$ and $H_2S$ at a second pressure, the first and second pressures being within a certain tolerance of one another. For example, the first and second pressures may be within approximately 20%, 15%, 10%, or 5% of one another, or the first and second pressures may be substantially the same (e.g., less than approximately 5% difference). In such an embodiment, the $H_2S$ may drive the $CO_2$ out of the solvent stream and into the vapor phase, resulting in an $H_2S$-rich solvent stream and a $CO_2$-rich gas mixture. The $H_2S$-rich solvent stream may be sent to a solvent stripper for $H_2S$ removal, and the $CO_2$-rich gas mixture may be sent to a $CO_2$ removal section of the plant. Accordingly, such a configuration enables an enhancement in the concentration of $H_2S$ provided to a sulfur processing section, while concomitantly maintaining relatively high levels of carbon capture.

In one non-limiting example, the gas mixture may be produced within an $H_2S$ concentrator of an $H_2S$ concentration and solvent stripping section (e.g., a first section) of the gas purification system. Further, the solvent stream that is substantially free of $H_2S$ and saturated in $CO_2$ may be produced by a flash vessel (e.g., a low, medium, or high pressure flash vessel) of a $CO_2$ absorption section (e.g., a second section) of the gas purification system. Therefore, in a general sense, a gas path, a solvent path, or both, may couple first and second sections of the gas purification system. An embodiment of an IGCC plant incorporating such a gas purification system is discussed below.

It should be noted that while reference is made to an IGCC plant in the present disclosure, the current approaches may be applicable to a number of embodiments, such as a gasification plant or a substitute natural gas (SNG) production plant. Indeed, any facility including gas processing and carbon capture sections may benefit from the embodiments disclosed herein. Moving now to the figures and referring initially to FIG. 1, a diagram of an embodiment of an integrated gasification combined cycle (IGCC) system 100 that may be powered by synthetic gas, i.e., syngas is illustrated. Elements of the IGCC system 100 may include a fuel source 102, such as a solid feed, that may be utilized as a source of energy for the IGCC. The fuel source 102 may include coal (including low sulfur content coal), petroleum coke, biomass, wood-based materials, agricultural wastes, tars, coke oven gas and asphalt, or other carbon containing items.

Figure 1:
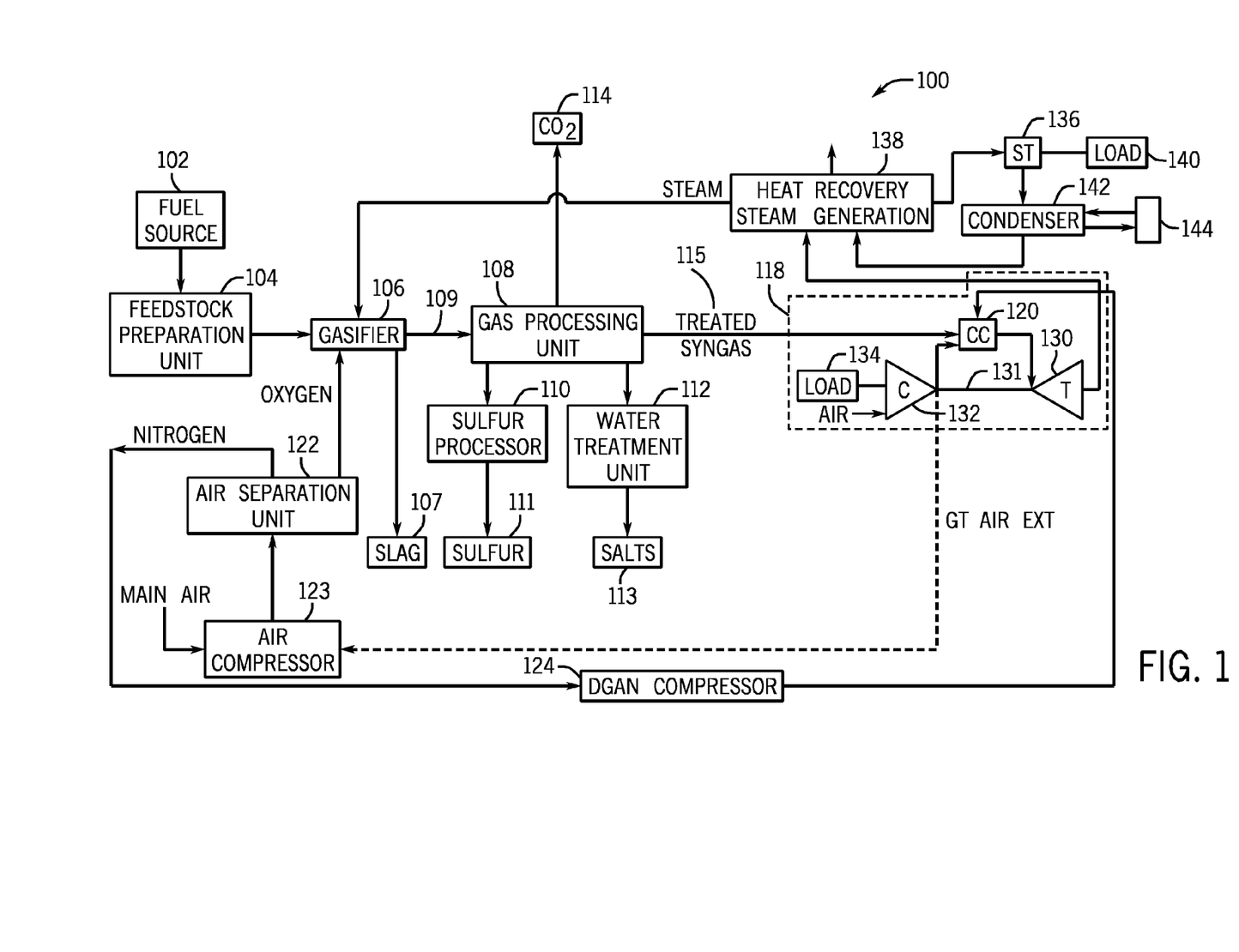
FIG. 1 is a schematic diagram of an embodiment of an integrated gasification combined cycle (IGCC) power plant having a gas processing unit configured to recover sulfur using a carbon rich solvent.

The solid fuel of the fuel source 102 may be passed to a feedstock preparation unit 104. The feedstock preparation unit 104 may, for example, resize or reshape the fuel source 102 to generate feedstock. Additionally, water or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide (CO) and hydrogen ($H_2$) and other components, such as residual gases and solid by-products. Indeed, an untreated syngas mixture 109 is produced in the gasifier 106. By way of a non-limiting example, the gas mixture may include syngas, as well as $CH_4$, HCl, HF, COS, $NH_3$, HCN, and $H_2S$. The gas mixture may be considered untreated, raw, or sour syngas and may include up to approximately 20 percent by volume $H_2S$. For example, the untreated syngas may include approximately 1, 5, 10, 15, or 20% by volume $H_2S$, depending on the sulfur content of the feedstock. For some coals, such as Powder River Basin (PRB) coals (e.g., sub-bituminous coals), relatively low levels of $H_2S$ may be produced. As will be discussed in further detail below, such low levels may be problematic for sulfur processing, which may utilize $H_2S$-rich streams for the isolation of elemental sulfur.

In addition to the gaseous mixture, the gasifier 106 may generate slag 107, which may be a wet ash material. The slag 107 may be removed from the gasifier 106 and utilized as road base or as another building material. The untreated syngas mixture 109 is then passed to a gas processing unit (GPU) 108 (e.g., a gas purification system) for removal of the various non-syngas components mentioned above. In general, the GPU 108 may receive the untreated syngas mixture 109 and remove a number of gases, including HCl, HF, COS, HCN, and $H_2S$ from the untreated syngas mixture 109. According to certain embodiments, the gas processing unit 108 may utilize a combination of processes such as $H_2S$ absorption, $H_2S$ concentration, $CO_2$ absorption, $CO_2$ capture, $CO_2$ dehydration, and so forth. Further, the GPU 108 may transmit $H_2S$-rich gas to a sulfur processor 110, such as a Claus reactor. Indeed, in accordance with present embodiments, the GPU 108 may include one or more vessels, solvent paths, and gas paths to separate and isolate $CO_2$ and $H_2S$ from syngas and each other to enable high levels of carbon capture and sulfur processing, even in situations where sub-bituminous (i.e., low sulfur) coal is used for gasification. The $H_2S$ gas may be processed by the sulfur processor 110 to generate sulfur 111 for export. Salts 113 may be separated from the untreated syngas mixture 109 via a water treatment unit 112 that utilizes water purification techniques to generate usable salts 113 from the untreated syngas.

As mentioned, the GPU 108 may be configured to perform carbon dioxide ($CO_2$) capture. Using one or more solvents (e.g., a physical and/or chemical solvent), $CO_2$ 114 is removed from the syngas and is transmitted to, for example, a pipeline for external transmission or for use in power generation processes.

Subsequent and/or substantially simultaneously to some the processes described above, the gas exiting the GPU 108 may be considered a treated, sweetened, and/or purified syngas 115. That is, the treated syngas 115 may be substantially free of sulfur, as well as residual gas components. The treated syngas exiting the GPU 108 may be of sufficient purity for use as fuel. By way of a non-limiting example, the treated syngas 115 exiting the GPU 108 may include less than approximately 25 ppmv $H_2S$, such as between 1 and 25 ppmv. In one embodiment, the treated syngas 115 may include less than approximately 1 ppmv $H_2S$. This treated syngas 115 may be transmitted to a gas turbine engine 118, such as to a combustor 120 of the engine 118, as combustible fuel.

The IGCC system 100 may further include an air separation unit (ASU) 122. The ASU 122 may operate to separate air into component gases by, for example, distillation techniques. The ASU 122 may separate oxygen from air supplied by a supplemental air compressor 123. The ASU 122 may then transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the combustion of the syngas. Thus, once the DGAN compressor 124 has adequately compressed the nitrogen to a proper level, the DGAN compressor 124 may transmit the compressed nitrogen to the combustor 120 of the gas turbine engine 118.

The gas turbine engine 118 may include a turbine 130, a drive shaft 131 and a compressor 132, as well as the combustor 120. The combustor 120 may receive fuel, such as the treated syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This causes the compressor 132 to compress air received via an air intake in the compressor 132. The compressed air may then be fed to the combustor 120. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 144 to exchange heated water for chilled water, which may aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

As mentioned, the embodiments disclosed herein are generally directed toward using a solvent mixture produced in a $CO_2$ absorption section of the GPU 108 to remove $H_2S$ from a gaseous stream produced in a $H_2S$ recovery section of the GPU 108. In accordance with certain approaches, the solvent mixture is saturated in $CO_2$ and is lean in $H_2S$ at a first pressure, which enables it to remove $H_2S$ from the gaseous stream. Such a configuration is depicted generally in the block diagram of FIG. 2, which illustrates an embodiment of the GPU 108 having an $H_2S$ absorption section 150, a $CO_2$ absorption section 152, and a $H_2S$ recovery and solvent stripping section 154.

Figure 2:
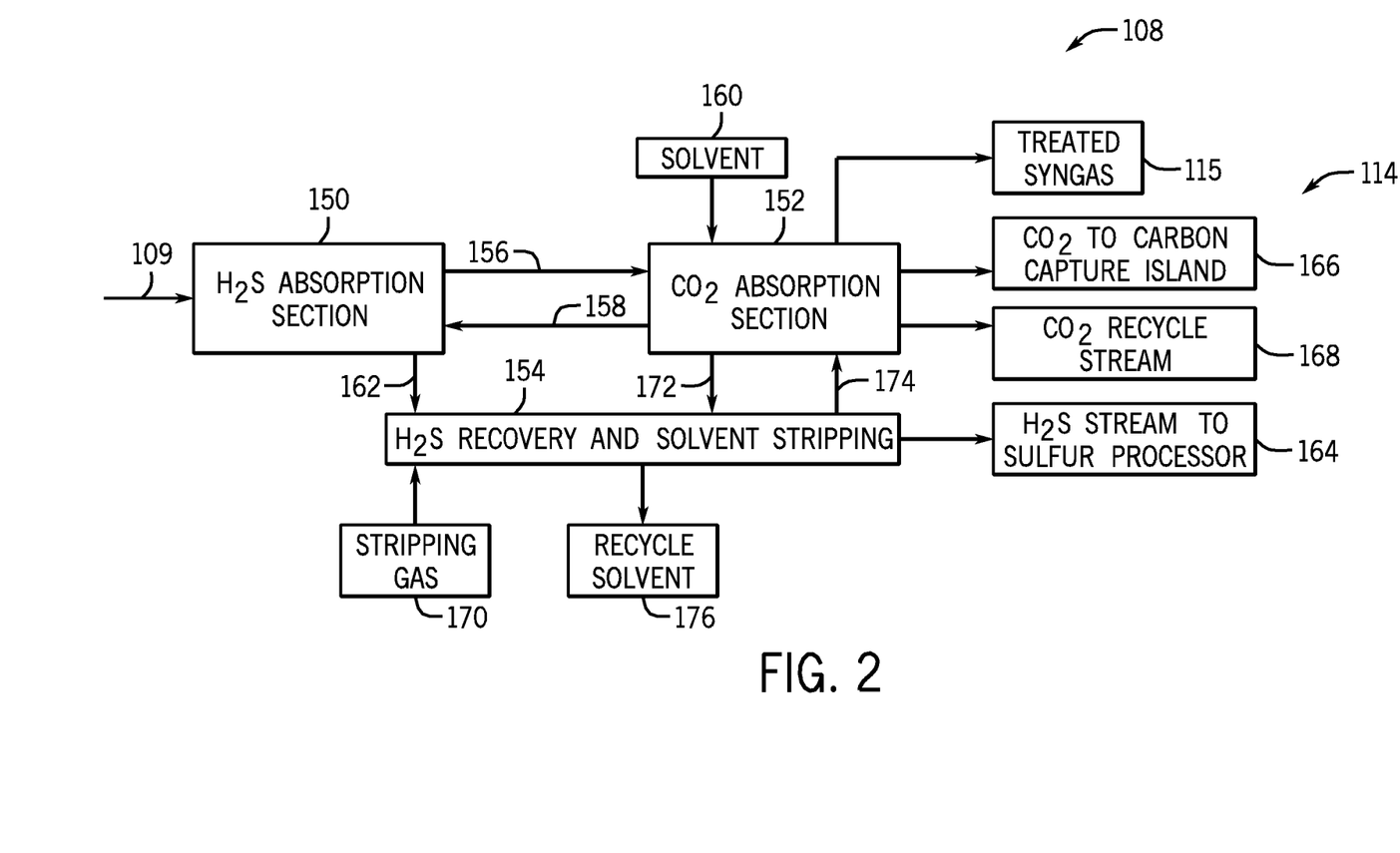
FIG. 2 is a block diagram of an embodiment of the gas processing unit of FIG. 1.

As illustrated, the $H_2S$ absorption section 150 provides a first gaseous stream 156 to the $CO_2$ absorption section 152 and receives a first solvent stream 158 from the $CO_2$ absorption section 152. The gaseous stream 156 includes a stream of syngas that is lean in $H_2S$ and is rich in $CO_2$ at its respective pressure. Essentially, the first gaseous stream 156 is the product of $H_2S$ removal from the raw or untreated syngas 109 produced within a gasifier (e.g., gasifier 106 of FIG. 1). The $CO_2$ absorption section 152 utilizes a solvent 160, such as a physical or chemical solvent (e.g., a methyl tert-butyl ether of polyethylene glycol (MTBPG), a methyl isopropyl ether of polyethylene glycol (MIPG), a methyl ethyl ether of polyethylene glycol (MEPG), or a dimethyl ether of polyethylene glycol (DEPG)), or a combination thereof, to remove a substantial portion of the $CO_2$ contained within the first gaseous stream 156 (e.g., at least approximately 50, 60, 70, 80, or 90% removal) to produce the first solvent stream 158 and the treated syngas 115. Accordingly, the first solvent stream 158 contains a significant amount of $CO_2$, and in some embodiments may be saturated in $CO_2$ at its respective pressure. Generally, the first solvent stream 158 may be considered lean in $H_2S$ and rich in $CO_2$. As discussed in further detail below with respect to FIG. 3, the first solvent stream 158 may be used to remove $H_2S$ from the raw or untreated syngas 109 in the $H_2S$ absorption section 150. Using the first solvent stream 158, the $H_2S$ absorption section 150 therefore produces a second solvent stream 162, which is rich in both $H_2S$ and $CO_2$. It is this solvent stream that is manipulated to address various desired specifications in the recovered $CO_2$ 114 and recovered $H_2S$ 164 (e.g., an acid gas stream) for sulfur processing using both the $CO_2$ absorption section 152 and the $H_2S$ recovery and solvent stripping section 154.

For example, the recovered $CO_2$ 114 may include a $CO_2$ stream for carbon capture 166 and a $CO_2$ stream for recycle to the gasifier 168 (e.g., gasifier 106 of FIG. 1). The specifications of each of these may be substantially the same, or they may be different, depending on process requirements. For example, it may be desirable for the $CO_2$ stream for carbon capture 166 to be greater than approximately 90% $CO_2$ by volume, or even greater than approximately 95% $CO_2$ by volume. Similarly, the specifications for the recovered $H_2S$ for sulfur processing 164 may call for a minimal level of $H_2S$, such that the recovered $H_2S$ stream 164 is at least approximately 20%, 25%, or at least approximately 30% $H_2S$ by volume.

To enable the GPU 108 to meet these specifications, the $H_2S$ recovery and solvent stripping section 154 uses a stripping gas 170, such as a relatively non-reactive gas (e.g., $N_2$, Ar, He), to separate the $CO_2$ and $H_2S$ from the solvent in the second solvent stream 162. Accordingly, the $H_2S$ recovery and solvent stripping section 154 internally produces a gaseous mixture having the stripping gas, $CO_2$, and $H_2S$. This gaseous mixture is counterflowed with a third solvent stream 172 from the $CO_2$ absorption section 152. The third solvent stream 172 is rich in $CO_2$ and lean in $H_2S$ at its respective pressure. When the stream 172 is counterflowed with the gaseous mixture, the stream 172 is capable of removing $H_2S$ from the gaseous mixture. Further, as discussed in detail below with respect to FIG. 5, in accordance with an embodiment, the third solvent stream 172 and the gaseous mixture are pressure matched within a mixing vessel such that the $H_2S$ of the gaseous mixture displaces the $CO_2$ of the third solvent stream 172 into the vapor phase. Accordingly, a second gaseous stream 174 that is rich in $CO_2$ and substantially free of $H_2S$ is produced, and contributes to the overall recovered $CO_2$ 114. That is, the overall amount of recovered $CO_2$ may increase.

A solvent mixture that is rich in the $H_2S$ removed from the gaseous mixture is also internally produced within the $H_2S$ recovery and solvent stripping section 154. This solvent mixture is further processed (e.g., flashed) to produce a recycle solvent 176 and the $H_2S$ stream 164. In accordance with the disclosed embodiments, this recovery method enhances the overall amount and concentration of recovered $H_2S$.

Figure 3:
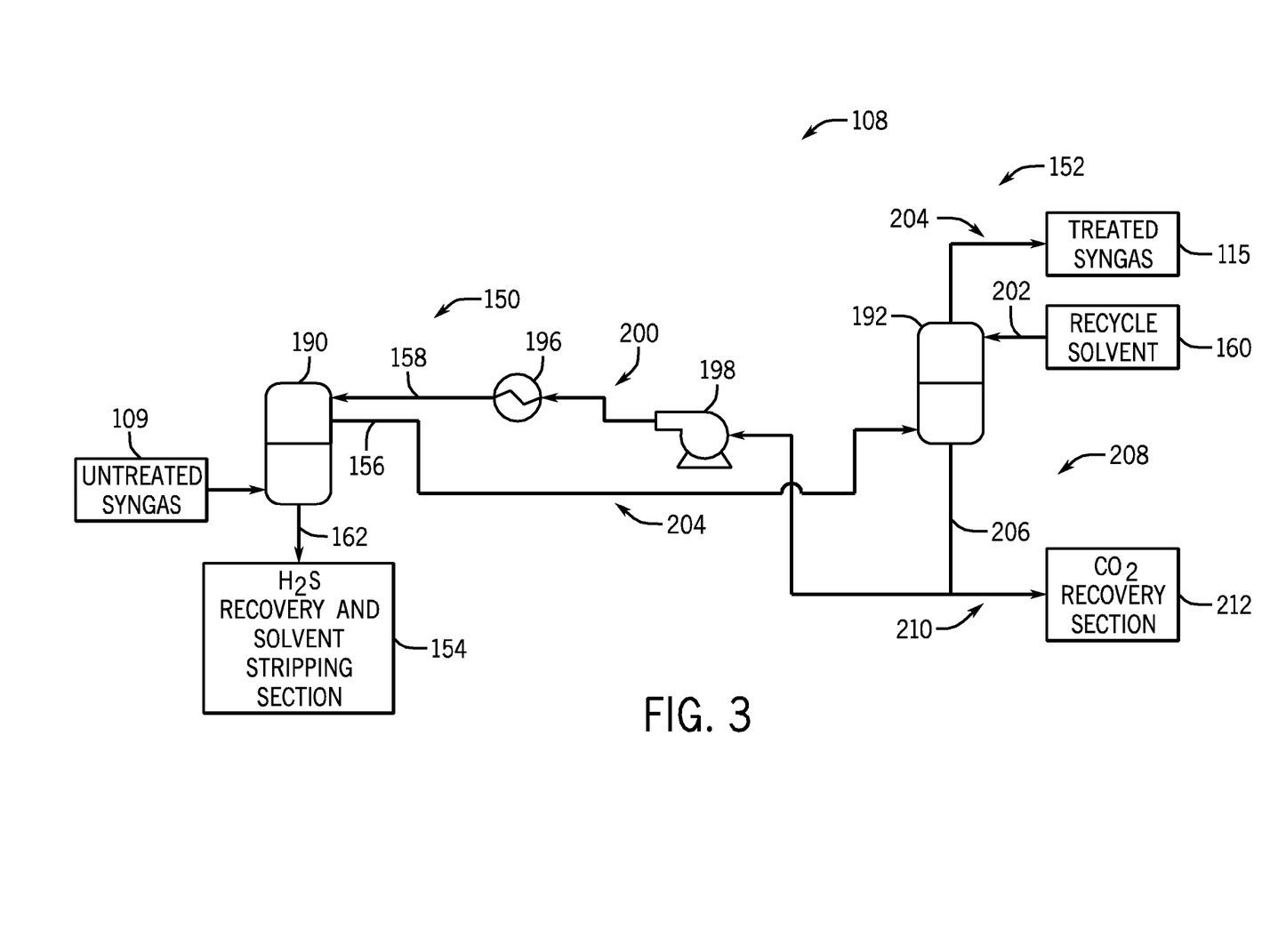
FIG. 3 is a schematic diagram of an embodiment of the gas processing unit of FIG. 2, illustrating integration of $H_2S$ absorption section and $CO_2$ absorption section illustrated in FIG. 2.

Moving now to FIG. 3, a schematic diagram is provided and illustrates an embodiment of a portion of the GPU 108 in which an $H_2S$ absorber 190 of the $H_2S$ absorption section 150 is coupled to a $CO_2$ absorber 192 of the $CO_2$ absorption section 152. As defined herein, an $H_2S$ absorber (e.g., $H_2S$ absorber 190) is intended to denote any vessel in which $H_2S$ is absorbed or otherwise taken into a solvent, such as a physical or chemical solvent, from a gaseous mixture or another solvent stream having $H_2S$. For example, in one embodiment, the $H_2S$ absorber may absorb only some of the $H_2S$, or all of the $H_2S$ from a gaseous mixture. Similarly, a $CO_2$ absorber, as defined herein, is intended to denote any vessel in which $CO_2$ is absorbed or otherwise taken into a solvent, such as a physical or chemical solvent, from a gaseous mixture or another solvent stream having $CO_2$. Thus, in some embodiments, the $CO_2$ absorber may absorb only some of the $CO_2$, or all of the $CO_2$ from a gaseous mixture. Thus, in present embodiments, the first solvent stream 158 is used to remove, within the $H_2S$ absorber 190, a substantial portion of the $H_2S$ from untreated syngas 109 flowing along a path between the gasifier 106 and the GPU 108. Specifically, as the untreated syngas 109 progresses through this path, it enters the $H_2S$ absorber 190, where it is mixed with the first solvent stream 158.

The $H_2S$ absorber 190 may be a vessel, such as a column or elongated tank, which is configured to allow mixing of the untreated syngas 109 with the first solvent stream 158. In the illustrated embodiment, the untreated syngas 109 enters the $H_2S$ absorber 190 at a lower area of the $H_2S$ absorber 190. Conversely, the first solvent stream 158 enters into the $H_2S$ absorber 190 at an upper area. As a result of this configuration, the untreated syngas 109 is allowed to efficiently mix with the first solvent stream 158 via a countercurrent effect. As the first solvent stream 158 mixes with the untreated syngas 109, it removes a substantial portion of the $H_2S$ from the untreated syngas 109 along with some $CO_2$. Thus, a stream of sweetened syngas (substantially removed of $H_2S$) exits the $H_2S$ absorber 190 as the first gaseous stream 156, while the second solvent stream 162 that is rich in $H_2S$ is provided to the $H_2S$ recovery and solvent stripping section 154.

The solubility of $H_2S$ within certain solvents, such as physical solvents, may be greater than the solubility of other gaseous components (e.g., syngas, $CO_2$) at reduced temperatures and increased pressures (e.g., above standard temperature and pressure). Thus, in certain embodiments, a heat exchanger 196 (e.g., a chiller) and a pump 198 may be disposed along a solvent path 200 to cool and flow, respectively, the first solvent stream 158 to enable enhanced uptake of the $H_2S$ into the solvent. By way of example, the stream 158 may be pressurized to between approximately 27 and 42 bar and cooled to between approximately 0 and 20° C. That is, the solvent stream 158 flowing into the $H_2S$ absorber 190 may be at a pressure between approximately 30 and 40 bar, 32 and 38 bar, or 34 and 36 bar. By pressurizing and cooling the stream 158, the ability of the solvent of the stream 158 to dissolve sulfur gases (i.e., $H_2S$) may be increased compared to the solvent at standard pressure and temperature. Indeed, in some embodiments, the first gaseous stream 156 flowing through a gas path 204 to the $CO_2$ absorber 192 may have at most between approximately 5 and 55 ppmv $H_2S$ (e.g., approximately 5, 10, 15, 20, 25, 30, 35, 40, 45, 50, or 55 ppmv).

During operation, solvent 160, such as recycle solvent, may be directed via path 202 to the $CO_2$ absorber 192. In the $CO_2$ absorber 192, the first gaseous stream 156 flowing though the gas path 204 enters a bottom portion of the $CO_2$ absorber 192. Mixing produced by a countercurrent between the downward-flowing stream of the solvent 160 and the upward-rising first gaseous stream 156 causes a stream of $CO_2$-saturated solvent 206 to exit the $CO_2$ absorber 192 via path 208, which is bifurcated. Specifically, the path 208 bifurcates into the solvent path 200 and an additional solvent path 210 leading a section for $CO_2$ recovery 212. The pump 198 may at least partially motivate the first solvent stream 158 through the path 200, and the level at which it provides motive force may at least partially affect the amount of the $CO_2$-saturated solvent 206 sent to the path 200 versus the path 210.

In accordance with present embodiments, the level of $CO_2$ recovered and the concentration of $H_2S$ recovered in acid gas (i.e., the concentration of $H_2S$ in the stream 164 of FIG. 2) may be affected by the ratio in which the $CO_2$-saturated solvent 206 is provided to the path 200 versus the path 210. Generally, increasing the fraction of the $CO_2$-saturated solvent 206 sent along path 210 results in greater $CO_2$ recovery and $H_2S$ concentration by the GPU 108. By way of a non-limiting example, in embodiments where the untreated syngas 109 is low in $H_2S$ (i.e., the fuel source 102 is low in sulfur), dividing the $CO_2$-saturated solvent 206 such that greater than approximately 90% of the $CO_2$-saturated solvent 206 in path 208 is sent to path 210 results in enhanced $H_2S$ concentrations in the acid gas recovered at the $H_2S$ recovery and solvent stripping section 154. That is, in certain situations, the fuel source 102 may relatively low in sulfur. In these situations, a target amount for syngas may be attained, but the amount of sulfur recovered may not meet appropriate levels for sulfur recovery. The illustrated configuration in FIG. 5 where a large portion (e.g., approximately 90%) of the $CO_2$-saturated solvent 206 is provided to path 210, which boosts the concentration of sulfur in a stream of recovered acid gas. Further, reducing the temperature of the $CO_2$-saturated solvent 206 at the heat exchanger 196 to between approximately 0 and 20° C. (e.g., 15, 10, 5, or 0° C.) may facilitate such enhanced concentration.

Figure 4:
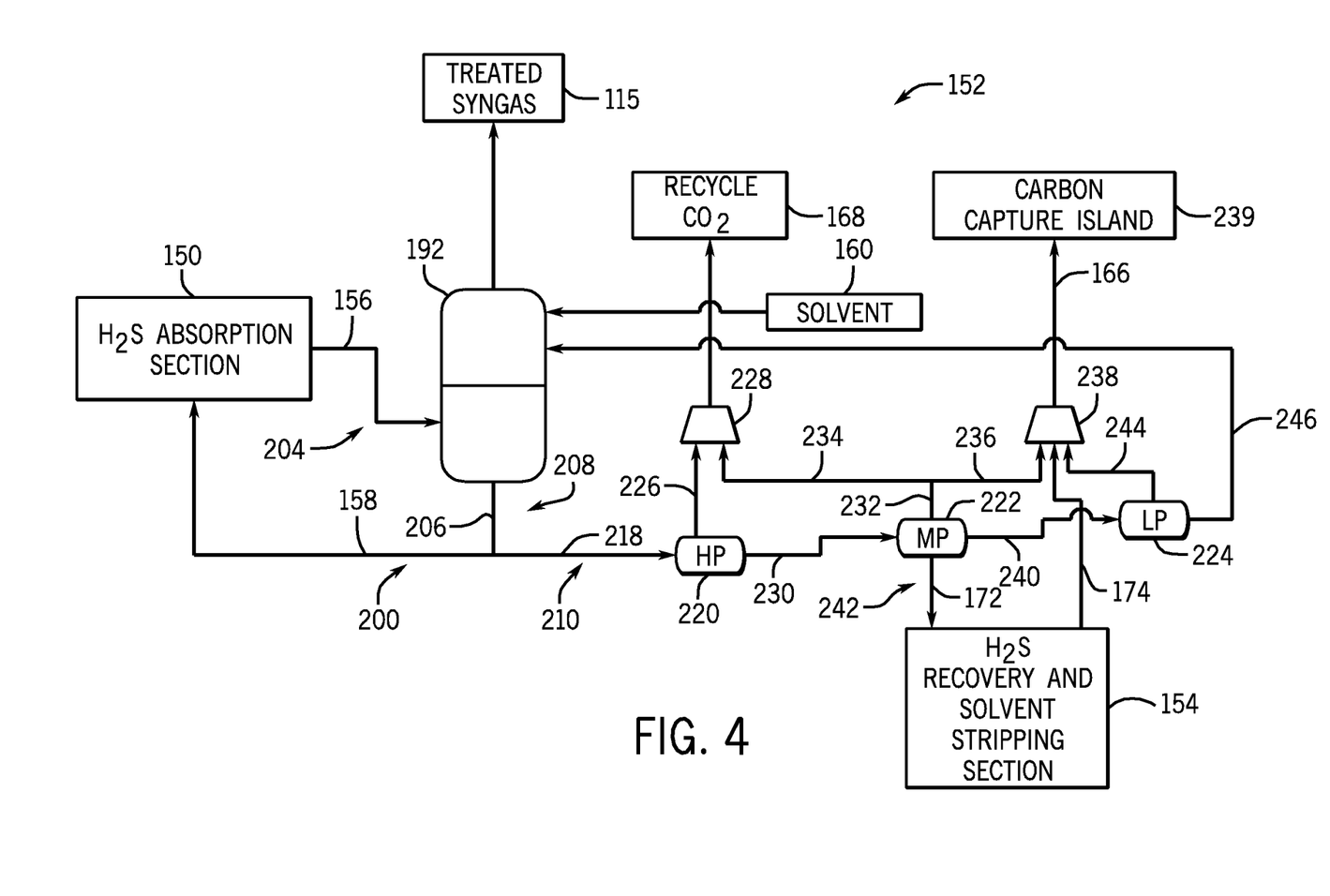
FIG. 4 is a schematic diagram of an embodiment of the configuration of the $CO_2$ absorption section illustrated in FIG. 2.

A schematic diagram illustrating an embodiment of the $CO_2$ absorption section 152 is illustrated in FIG. 4. Specifically, the $CO_2$ absorption section 152 of FIG. 4 includes the $CO_2$ absorber 192 and various flash vessels configured for $CO_2$ recovery. As discussed above, the $CO_2$ absorber 192 is configured to scrub the first gaseous stream 156, which is lean in $H_2S$ and rich in $CO_2$, to remove a substantial portion of the $CO_2$ to produce the treated syngas 115 and the stream of $CO_2$-saturated solvent 206. Again, a portion of the stream 206 is sent along path 200 to the $H_2S$ absorber 180 (FIG. 3), while another portion of the stream 206 is sent along the solvent path 210 for $CO_2$ recovery as a first solvent mixture 218.

Specifically, the solvent path 210 leads to a series of flash vessels including a high pressure (HP) flash vessel 220, a medium pressure (MP) flash vessel 222, and a low pressure (LP) flash vessel 224. It should be noted that while example pressures are provided below to facilitate discussion of the present embodiments, the phrases "high pressure," "medium pressure," and "low pressure" are intended to denote relative pressures between the flash vessels. Further, it should be noted that the use of three flash vessels is also presented to facilitate discussion. Accordingly, configurations coupling the $CO_2$ absorption and $H_2S$ recovery sections in the manner presented herein and having any number of flash vessels (e.g., one or more) is presently contemplated. Moreover, the term "flash," as defined in the present disclosure, is intended to denote a flash evaporation. Thus, when a vessel "flashes" a solvent mixture, the vessel performs a flash evaporation of the solvent mixture, with at least a portion of the solvent undergoing a rapid volatilization.

Generally, the flash vessels are configured to sequentially reduce the pressure of the first solvent mixture 218, which produces $CO_2$ in the vapor phase for $CO_2$ capture and/or recycle. The solvent path 210 first leads to the HP flash vessel 220, which flashes the first solvent mixture 218 to produce a first stream of $CO_2$ 226 at a respective first pressure. By way of non-limiting example, the HP flash vessel 220 may be operated at a pressure between approximately 6 and 27 bar, such as approximately 8, 10, 12, 14, 16, 18, 20, 22, 24, or 26 bar, with the first stream of $CO_2$ 226 having substantially the same pressure. The first stream of $CO_2$ 226 is sent to a recycle compressor 228, which produces the stream of $CO_2$ 168. The recycle $CO_2$ 168 may be used as a recycle stream to the gasifier (e.g., gasifier 106 of FIG. 1), to the $H_2S$ absorber 190, to areas of the system 100 of FIG. 1 between the gasifier 106 and the $H_2S$ absorber 190, or any suitable section in the system 100.

The HP flash vessel 220 also produces a second solvent mixture 230, which includes a solvent saturated in $CO_2$ and lean in $H_2S$ (e.g., substantially free of $H_2S$) at a respective pressure substantially equal to the HP flash vessel 220. The second solvent mixture 230 flows along the solvent path 210 to the MP flash vessel 222. The MP flash vessel 222 is configured to flash the second solvent mixture 230 at its operating pressure, which is lower than the pressure of the HP flash vessel 220. By way of a non-limiting example and with respect to the ranges listed above for the HP flash vessel 220, the operating pressure of the MP flash vessel 222 may be between approximately 4 and 21 bar, such as between approximately 6 and 20 bar, 8 and 18 bar, 10 and 16 bar, or between approximately 12 and 14 bar.

The MP flash vessel 222 produces a second $CO_2$ stream 232, which is split into a first $CO_2$ path 234 leading to the recycle compressor 228 and a second $CO_2$ path 236 leading to a carbon capture compressor 238, which is configured to produce the $CO_2$ stream 166 (FIG. 2). As noted above with respect to FIG. 2, the $CO_2$ stream 166 is sent to various plant facilities for carbon capture, such as a carbon capture island 239. In addition to the second $CO_2$ stream 232, the MP flash vessel 222 also produces a third solvent mixture 240, which is rich in $CO_2$ and lean in $H_2S$ at its respective pressure (e.g., substantially the same as the MP flash vessel 222).

As illustrated, the third solvent mixture 240 is split, with a first portion being provided along the main solvent path 210 to the LP flash vessel 224, and a second portion being split into a divergent solvent path 242. Specifically, the second portion of the third solvent mixture 240 is the third solvent stream 172, which is utilized in the $H_2S$ recovery and solvent stripping section 154. As discussed in further detail below with respect to FIG. 4, the third solvent stream 172, which is rich in $CO_2$ and lean in $H_2S$, is utilized to remove $H_2S$ from a gaseous mixture of $CO_2$ and $H_2S$ produced within the $H_2S$ recovery and solvent stripping section 154. Indeed, as a result of this treatment, the second gaseous stream 174 that is rich in $CO_2$ and substantially free of $H_2S$ is produced and is provided to the carbon capture compressor 238.

Returning to the third solvent mixture 240, the first portion is provided to the LP flash vessel 224, which is operated at a respective pressure that is lower than the pressure of the MP flash vessel 222. By way of non-limiting example, the pressure of the LP flash vessel 224 may be between approximately 1 and 6 bar, such as between approximately 1 and 5, or 2 and 4 bar. Again, any pressure that is lower than the pressures of the MP and HP flash vessels 220, 224 is presently contemplated. The LP flash vessel 224 flashes the third solvent mixture 240 to produce a third $CO_2$ stream 244, which is provided to the carbon capture compressor 238. The LP flash vessel 224 also produces a fourth solvent mixture 246, which is saturated in $CO_2$ and lean in $H_2S$ at a pressure that is substantially equal to that of the LP flash vessel 224. As illustrated, the fourth solvent mixture 246 is provided as a source of recycle solvent to the CO2 absorber 192. However, the fourth solvent mixture 246 may be sent, in addition to or in lieu of the CO2 absorber 192, to other areas of the system, such as to an ultra-low pressure flash vessel (LLP) flash vessel, a storage tank (e.g., a solvent storage tank), heat exchangers, or similar areas of the plant.

As noted above with respect to FIG. 2, the $H_2S$ recovery and solvent stripping section 154 is configured to use a $CO_2$ rich, $H_2S$ lean solvent stream to remove $H_2S$ from a $H_2S/CO_2$ gas mixture. In performing this removal, the section 154 increases recovered $H_2S$ while enabling enhanced $CO_2$ recovery. One embodiment of the $H_2S$ recovery and solvent stripping section 154 is depicted schematically in FIG. 5. As illustrated, the $H_2S$ recovery and solvent stripping section 154 includes an $H_2S$ concentrator 250, an H2S re-absorber 252, and a solvent stripper 254.

Figure 5:
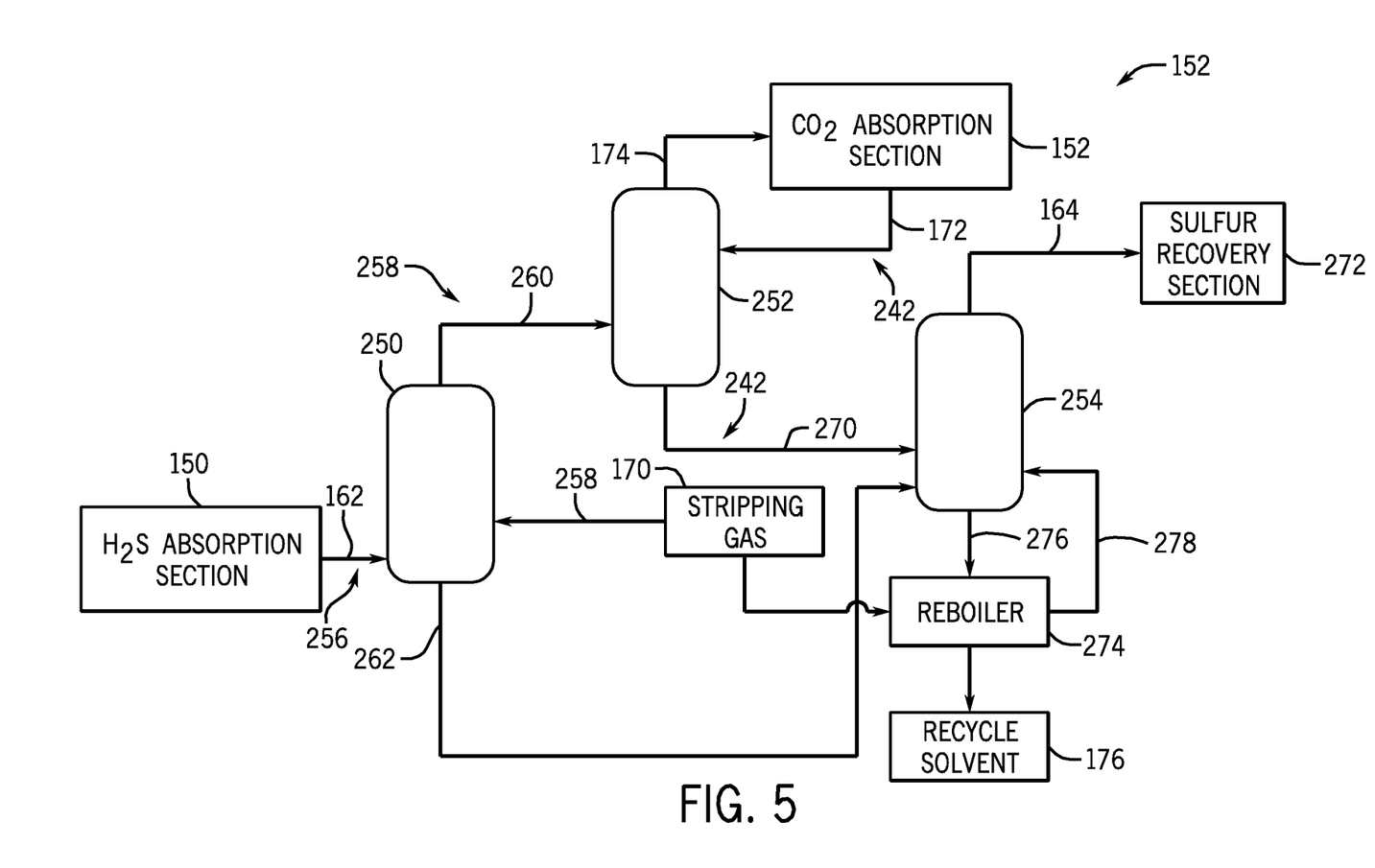
FIG. 5 is a schematic diagram of an embodiment of the configuration of the $H_2S$ recovery and solvent stripping section illustrated in FIG. 2.

The $H_2S$ concentrator 250 is configured to receive the second solvent stream 162, which is rich in both $H_2S$ and $CO_2$, along a first solvent path 256, from the $H_2S$ absorption section 150. In one embodiment, as illustrated in FIGS. 3 and 5, the $H_2S$ concentrator 250 receives the second solvent stream 162 from the $H_2S$ absorber 190. The $H_2S$ concentrator 250 also receives the stripping gas 170 from a gas path 258. The stripping gas 170 may include any substantially inert gas as noted above, and flows against the second solvent stream 162 within the $H_2S$ concentrator 250. This enables the stripping gas 170 to remove a substantial portion of the $H_2S$ and $CO_2$ from the second solvent stream 162 to produce a first gaseous mixture 260 including at least $H_2S$, $CO_2$, and the stripping gas 170. Indeed, an $H_2S$ concentrator, as defined herein, is intended to denote any vessel in which $H_2S$ is concentrated into a solvent mixture or a gas mixture. Thus, by removing the $H_2S$ from solution using the stripping gas 170, the $H_2S$ becomes concentrated into the first gaseous mixture 260 within the $H_2S$ concentrator 250.

The first gaseous mixture 260 flows along the gas path 258 to the $H_2S$ re-absorber 252. As will be discussed in detail below, the $H_2S$ re-absorber 252 is also disposed along the divergent solvent path 242, which diverges from the main solvent path 210 at the MP flash vessel 222 as illustrated in FIG. 4. Furthermore, an $H_2S$ re-absorber, as defined herein, is intended to denote any vessel in which $H_2S$ is absorbed or otherwise taken into a solvent from a gaseous mixture having the $H_2S$ that was first removed from a solvent mixture in a separate vessel. Thus, as discussed in further detail below, the $H_2S$ re-absorber 252 re-absorbs $H_2S$ from the gaseous mixture 260 having the $H_2S$ that was first removed within the $H_2S$ concentrator 250.

The first solvent path 256 is configured to flow a first solvent mixture 262, which may include some $CO_2$ and some $H_2S$, from the $H_2S$ concentrator 250 to the solvent stripper 254. Thus, in the illustrated embodiment, the first solvent path 256 couples the $H_2S$ concentrator 250 to the solvent stripper 254. Further, in certain embodiments, various heat exchangers and/or pumps may also be disposed between the $H_2S$ concentrator 250 and the solvent stripper 254 to meet certain specifications for processing the first solvent mixture 262 at the solvent stripper 254. Such processing is discussed in further detail below.

Returning to the first gaseous mixture 260 produced at the $H_2S$ concentrator 250, the first gaseous mixture 260 is mixed, within the $H_2S$-re-absorber 252, with the third solvent stream 172 produced within the $CO_2$ absorption section 152. As described above with respect to FIG. 4, the third solvent stream 172 is produced at the MP flash vessel 222 such that the third solvent stream 172 includes a solvent that is saturated in $CO_2$ at medium pressure. However, it should be noted that other pressures of the third solvent stream 172 are also presently contemplated. Thus, it is presently contemplated that, in addition to or in lieu of using the MP flash vessel 222, the third solvent stream 172 may be produced using the HP flash vessel 220 and/or the LP flash vessel 224. Accordingly, the third solvent stream 172 may be saturated in $CO_2$ at high pressure, medium pressure, or low pressure. However, in accordance with the illustrated embodiment, the third solvent stream 172 is saturated in $CO_2$ at medium pressure. Such a pressure may be desirable to match (e.g., be substantially equal to) the pressure of the first gaseous mixture 260. Generally, however, the $H_2S$ re-absorber 252 and the flash vessel used to generate the third solvent stream 172 may be operated at respective pressures that are within approximately 20% of each other, within approximately 10% of each other, within approximately 5% of each other, or at approximately the same pressure. Such relative pressure levels may enable the $H_2S$ of the first gaseous mixture 260 to displace the $CO_2$ of the third solvent stream 172.

The first gaseous mixture 260 is counterflowed with the third solvent stream 172 within the $H_2S$ re-absorber 252 such that $H_2S$ within the first gaseous mixture 260 is absorbed into the solvent of the third solvent stream 172. Moreover, the $H_2S$ in the first gaseous mixture 260 may also displace some or substantially all of the $CO_2$ contained within the first solvent mixture 260 due to its enhanced solubility in the solvent relative to $CO_2$ to produce the second gaseous stream 174, which is rich in $CO_2$ and substantially free of $H_2S$, as an overhead gas. The second gaseous stream 174 may also include the stripping gas.

The $H_2S$ re-absorber 252 may include any one or a combination of features for enhancing liquid-vapor contact and mixing. Accordingly, the $H_2S$ re-absorber may include one or more valve trays, packed columns having spherical or shape-rounded elements for enhancing surface area, Raschig rings, or any combination thereof. As a result of this mixing, between approximately 20 and 100% of the $H_2S$ may be removed from the first gaseous mixture 260. For example, between approximately 40 and 100%, 60 and 100%, 80 and 100%, 90 and 99%, or between approximately 92 and 98% of the $H_2S$ may be removed from the first gaseous mixture 260. Moreover, at least approximately 10% of the $CO_2$ within the third solvent mixture 172 may be displaced into the vapor phase by the $H_2S$ of the first gaseous mixture 260. By way of example, between approximately 10 and 100% of the $CO_2$ may be displaced into the vapor phase, such as between approximately 20 and 100%, 30 and 100%, 40 and 100%, 50 and 99%, or between approximately 60 and 90%. In certain embodiments, at least approximately 60%, at least approximately 75%, or at least approximately 85% of the $CO_2$ may be displaced.

Thus, the $H_2S$ re-absorber 252 produces the second gaseous stream 174, which is rich in $CO_2$ and substantially free of $H_2S$, and a second solvent mixture 270, which is rich in $H_2S$ and lean in $CO_2$. In one embodiment, the second solvent mixture 270 is substantially free of $CO_2$. The second solvent mixture 270 flows along the divergent solvent path 242 to the solvent stripper 254. Accordingly, the solvent of the second solvent mixture 270 may combine with the first solvent mixture 262.

The solvent stripper 254 may flash the second and third solvent mixtures 268, 270 (or the first and third solvent mixtures 262, 270) to generate the recovered $H_2S$ stream 164 as an overhead acid gas and the recycle solvent 176. In particular, in the illustrated embodiment, the recycle solvent 176 may be produced by the solvent stripper 254 in combination with a reboiler 274. The reboiler 274 is configured to heat a stripped solvent mixture 276 output by the solvent stripper 254 to a boil, and may, in certain embodiments, also flow a stripping gas (e.g., a portion of stripping gas 170) against the boiling stripped solvent mixture 276. The stripping gas 170 therefore recycles some vaporized solvent, some $CO_2$, and some $H_2S$ to the solvent stripper 254 as a reboiled gaseous mixture 278.

As noted above with respect to FIG. 2, the recovered $H_2S$ stream 164 may be provided to a sulfur processor (e.g., a Claus reactor) within a sulfur recovery section 272 for isolating elemental sulfur. Accordingly, the amount of sulfur recovered by the GPU 108 may depend at least partially on the $H_2S$ concentration of the third solvent stream 270. Again, the present embodiments provide for an enhancement in this concentration by using the third solvent stream 172 to isolate $H_2S$ from the first gaseous mixture 260.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas purification system, comprising:
a first section, comprising:
a hydrogen sulfide (H2S) concentrator;
an H2S re-absorber;
a first solvent path through the H2S concentrator;
a first gas path through the H2S concentrator and the H2S re-absorber; and
a second section, comprising:
a carbon dioxide (CO2) absorber;
a first flash vessel;
a second solvent path through the CO2 absorber, the first flash vessel, and the H2S re-absorber, wherein the second solvent path couples the first flash vessel with the H2S re-absorber to enable H2S uptake into the second solvent path within the H2S re-absorber; and
a third solvent path diverging from the second solvent path at the first flash vessel and coupling the first flash vessel with the CO2 absorber to enable solvent recycling from the first flash vessel to the CO2 absorber within the second section.

2. The system of claim 1, wherein the first solvent path is configured to flow a first solvent mixture to the H2S concentrator, and the first gas path is configured to flow a stripping gas to the H2S concentrator to remove H2S and CO2 from the first solvent mixture to produce a first gas mixture comprising the stripping gas, H2S, and CO2.

3. The system of claim 2, comprising a second gas path configured to flow a first syngas mixture to the CO2 absorber, wherein the second solvent path is configured to flow a solvent that is substantially free of CO2 and H2S through the CO2 absorber to remove CO2 from the first syngas mixture to produce a second solvent mixture, wherein the second solvent mixture is substantially free of H2S and is saturated in CO2.

4. The system of claim 3, wherein the first gas path is configured to flow the first gas mixture to the H2S re-absorber, the second solvent path is configured to flow the second solvent mixture to the H2S re-absorber to produce a third solvent mixture and a second gas mixture comprising CO2 and the stripping gas, and the H2S of the first gas mixture drives the CO2 out of the second solvent mixture within the H2S re-absorber such that the third solvent mixture is saturated in H2S and is substantially free of CO2.

5. The system of claim 4, wherein the first flash vessel is configured to reduce a first pressure of the second solvent mixture to a second pressure before the second solvent mixture is provided to the H2S re-absorber.

6. The system of claim 4, wherein the first section comprises a solvent stripper disposed along the first solvent path downstream from the H2S concentrator and along the second solvent path downstream from the H2S re-absorber, wherein the solvent stripper is configured to receive the third solvent mixture from the H2S re-absorber and a solvent discharge from the H2S concentrator.

7. The system of claim 4, wherein the second section comprises a CO2 compressor, the first gas path couples the H2S re-absorber with the CO2 compressor, and the first gas path is configured to deliver the second gas mixture to the CO2 compressor.

8. The system of claim 1, wherein the first flash vessel is a medium pressure flash vessel configured to operate at a flashing pressure between approximately 4 and 21 bar.

9. The system of claim 1, wherein the first flash vessel and the H2S re-absorber are operated at substantially the same pressure.

10. The system of claim 1, wherein the first flash vessel and the H2S re-absorber are operated at a first pressure and a second pressure, respectively, and the first and second pressures are within approximately 10% of one another.

11. The system of claim 1, wherein the gas purification system is configured to purify syngas from a gasifier.

12. A gas purification system, comprising:
a first section comprising a first solvent path and a first gas path, wherein the first gas path is configured to flow a stripping gas to remove hydrogen sulfide (H2S) and carbon dioxide (CO2) from the first solvent path in a first vessel to produce a first gas mixture;
a second section comprising a second solvent path, wherein the second solvent path is configured to flow a first solvent mixture from a flash vessel to a second vessel of the first section to remove H2 from the first gas mixture and CO2 from a second solvent mixture within the second vessel, the second solvent mixture comprises a solvent saturated in CO2 at a first pressure generated by the flash vessel, the second vessel is operated at a second pressure, and the first and second pressures are within approximately 20% of one another; and
a third solvent path exiting the flash vessel, wherein the third solvent path diverges from the second solvent path at the flash vessel and is configured to recirculate solvent within the second section.

13. The system of claim 12, wherein the first and second sections are coupled together via the first gas path and the second solvent path.

14. The system of claim 12, wherein the second section comprises a third vessel and a fourth vessel, the third vessel is configured to remove CO2 from a stream of syngas using the solvent to generate the second solvent mixture comprising the solvent saturated with CO2 at a third pressure, the fourth vessel is configured to generate the first solvent mixture from the second solvent mixture, and wherein the third pressure is higher than the first pressure.

15. A gas purification system, comprising:
an H2S absorption section, comprising:
a hydrogen sulfide (H2S) concentrator;
an H2S re-absorber;
a first solvent path through the H2S concentrator; and
a first gas path sequentially through the H2S concentrator and the H2S re-absorber, wherein the first gas path is configured to deliver a first gas mixture to the H2S re-absorber, and the first gas mixture comprises a stripping gas, carbon dioxide (CO2), and H2S; and
a second solvent path configured to flow a first solvent mixture saturated in CO2 at a first pressure from a first flash vessel of a CO2 absorption section to the H2S re-absorber to remove H2S from the first gas mixture; and a third solvent path diverging from the second solvent path at the first flash vessel, wherein the third solvent path is configured to flow a second solvent mixture saturated in $CO_2$ at the first pressure from the first flash vessel to a second flash vessel of the $CO_2$ absorption section.

16. The system of claim 15, wherein the H2S re-absorber is configured to output a second gas mixture comprising $CO_2$ to a $CO_2$ compressor of the $CO_2$ section and a third solvent mixture comprising a solvent saturated in H2S and substantially free of $CO_2$ at the first pressure to a solvent stripper of the H2S absorption section.

17. The system of claim 15, wherein the first flash vessel is a medium pressure flash vessel operated between 4 and 21 bar, and the H2S re-absorber is operated at substantially the same pressure as the medium pressure flash vessel.

18. The system of claim 15, wherein the first solvent path is configured to flow a third solvent mixture comprising a solvent saturated in H2S and $CO_2$ to the H2S concentrator, and the first gas path is configured to flow a stripping gas through the H2S concentrator to remove H2S and $CO_2$ from the third solvent mixture to produce the first gas mixture.

* * * * *